Oct. 20, 1970　　　F. J. HRACH ET AL　　　3,535,602
CAPACITOR AND METHOD OF MAKING SAME
Filed May 7, 1969

INVENTORS
FRANK J. HRACH
SOLOMON S. PAPELL

BY

ATTORNEYS

United States Patent Office 3,535,602
Patented Oct. 20, 1970

---

3,535,602
CAPACITOR AND METHOD OF MAKING SAME
Frank J. Hrach, Parma, and Solomon S. Papell, Berea, Ohio, assignors to the United States of America as represented by the Administrator of the National Aeronautics and Space Administration
Filed May 7, 1969, Ser. No. 822,518
Int. Cl. H01g 3/06
U.S. Cl. 317—258          14 Claims

ABSTRACT OF THE DISCLOSURE

A method of making a capacitor by solidifying a mixture of ferromagnetic metal particles, nonferromagnetic particles and a dielectric material in the presence of mutual perpendicular magnetic and electric fields.

---

A capacitor is disclosed wherein ferromagnetic particles and nonferromagnetic particles are retained in a predetermined orientation by a dielectric matrix to form a capacitive body. Electrodes are provided on the body for electrical connections.

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

Capacitors of the prior art basically comprise a layer of dielectric material sandwiched between two metal plates. Capacitors are made in a wide variety of shapes and sizes. For example, one common form of capacitor comprises several layers of plastic and metal foil which are rolled into a cylindrical shape. Many electrolytic capacitors are formed by stacking a plurality of foils each of which is coated with a dielectric paste. Some early capacitors comprised metal plates disposed in a dielectric liquid.

All of these prior art capacitors are similar in construction. Additionally, they are relatively heavy.

OBJECTS AND SUMMARY OF THE INVENTION

It is an object of the invention to provide a new and novel capacitor.

It is another object of the invention to provide a capacitor having a high capacitance to weight ratio.

It is a further object of the invention to provide a method for making a high capacitance to weight ratio capacitor.

It is yet another object of the invention to provide a capacitor in which magnetic and nonmagnetic metal particles are restrained in respective predetermined orientations by a suitable matrix to form a capactive body.

Still another object of the invention is to provide a method of making a capacitor by solidifying a dielectric matrix material while metal particles in the dielectric are maintained in respective predetermined orientations.

In summary, it is an object of the invention to provide a new and novel capacitor which has high capacitance in relation to its weight and to provide a method for making such a capacitor.

DESCRIPTION OF THE PREFERRED EMBODIMENT

Figure 1:
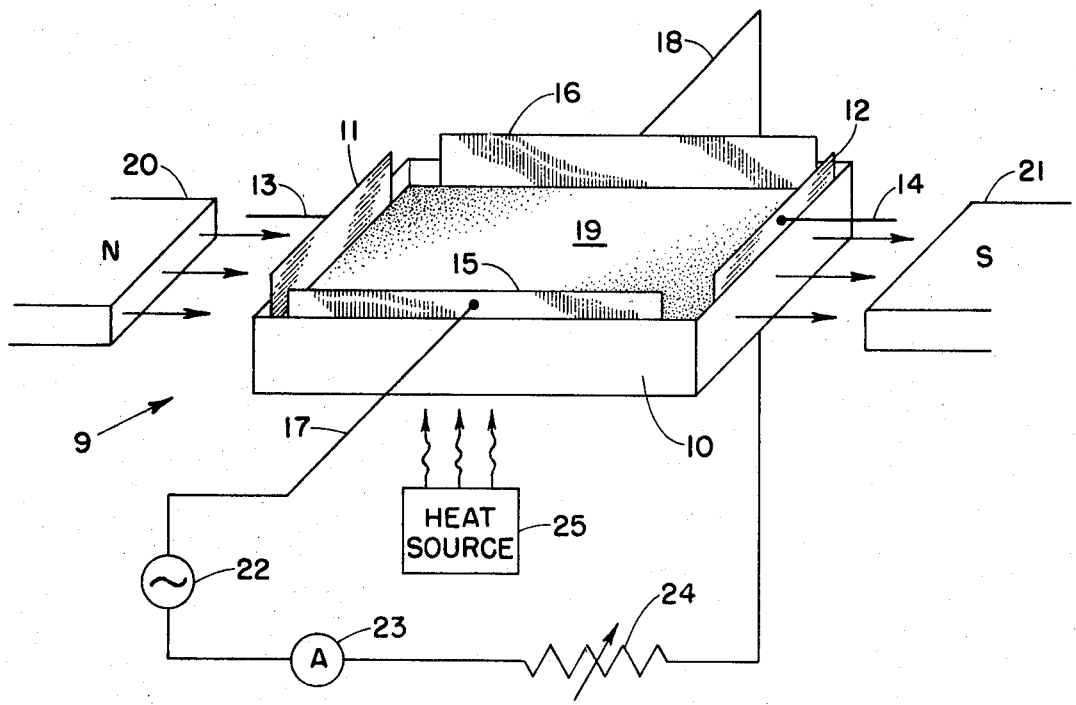
FIG. 1 is an illustration showing the apparatus and materials used to make a capacitor embodying the invention.

Referring now to FIG. 1, there is shown a container 10 which, if desired, may serve as a casing for a finished capacitor 9 made in accordance with the invention. In accordance with the invention, a pair of ferromagnetic metal foils 11 and 12 having respective electrical leads 13 and 14 attached thereto are disposed at respective opposite ends of the container 10 against the inside surfaces. In a like manner, a pair of nonferromagnetic metal foils 15 and 16 are respectively disposed against the inner surfaces of opposite sides of the container 10. The foils 15 and 16 are provided with electrical leads 17 and 18, respectively, and serve as electrodes for capacitor 9.

A capacitive body 19 of the inventive capacitor is formed by mixing ferromagnetic metal particles and nonferromagnetic metal particles in a molten or liquid dielectric material within the container 10 and then solidifying the dielectric material in the presence of magnetic and electrical fields as will be described presently. To the end that the capacitor will have maximum capacity with a reasonable voltage rating the mixture which forms the capacitive body 19 should preferably contain from about 10% to about 20% by volume of dielectric material, the remainder being approximately equally divided between ferromagnetic and nonferromagnetic particles. However, it will be clear to those skilled in the art that the voltage rating may be increased by increasing the percentage of dielectric material in the capacitive body 19.

To the end that the ferromagnetic particles and the nonferromagnetic particles mixed into the dielectric material will assume respective orientations which will provide maximum capacity in the capacitive body 19, a magnetic field is applied perpendicular to the ferromagnetic foils 11 and 12 by suitable magnet poles 20 and 21. At the same time, the electrical leads 17 and 18 are connected across a series combination of electrical elements comprising an AC generator 22, an ammeter 23 and a variable current limiting resistor 24. The voltage of the AC generator 22 is increased from zero to impress an alternating electric field between the foils 15 and 16 perpendicular to the magnetic field. This causes the nonferromagnetic particles to form conductive chains or filaments between the plates 15 and 16. When no further current increase is indicated by ammeter 23 as the voltage of generator 22 increases the desired electric field has been reached.

While the magnetic field and the alternating electric field are impressed across the capacitive body 19, the mixture of ferromagnetic particles, nonferromagnetic particles, and dielectric material is caused to solidify when ammeter 23 indicates a stable curent condition. As a result, the dielectric material freezes the ferromagnetic and nonferromagnetic particles in the positions which they assumed as a result of the impressed electrical and magnetic fields. The fields are then removed and the dielectric serves as a matrix for the particles.

As described above, an alternating electric field is impressed between the foils 15 and 16. The alternating field prevents drift of the nonferromagnetic particles toward one nonferromagnetic foil and away from the other as would occur if a unidirectional electric field were used. The frequency output of the AC generator must be high enough to prevent substantial drift of the nonferromagnetic particles toward either foil 15 or 16. This frequency is dependent on the size of the nonferromagnetic particles as well as on the solidification time of the dielectric material.

Where the dielectric material is one which solidifies rapidly or where means is provided to quickly chill the dielectric material, the AC generator may be replaced by a suitable direct current source and a switch. With this arrangement, a unidirectional electric field can be impressed briefly between the foils 15 and 16 without causing significant drift of the nonferromagnetic particles.

With regard to the dielectric material, it may be a substance such as halo wax or a similar material which must be heated above ambient temperature to melt it. With such materials for use as dielectrics, heat may be applied to the container 10 from a suitable heat source 25. Solidification is achieved by removing the heat source 25 and, additionally, cooling the container if desired.

Where speed is not an important consideration, melting of the dielectric material may be achieved by heat generated by the alternating electric field. Of course, as the nonferromagnetic particles form filaments between the foils 15 and 16 the heating effect will decrease because of the increasing conductivity thus allowing the dielectric material to solidify automatically.

For convenience and to achieve high uniformity of distribution of the metal particles in the dielectric material, a powdered dielectric material can be advantageously used. The metal particles may be first thoroughly mixed with the powdered dielectric material before or after being placed in the container 10. Heat is then applied to the mixture to melt the dielectric material in the presence of the magnetic and electric fields, after which the dielectric is solidified to form the capacitive body 19.

In order to obtain maximum capacity in the capacitive body 19, maximum packing of the ferromagnetic and nonferromagnetic particles is desired. Accordingly, the size of the particles must be as small as possible. In accordance with the invention, the ferromagnetic and nonferromagnetic particles preferably range in size from 0.2 microns up to 1 micron. Because this is the general colloidal range, particles of this size may be used with a relatively low viscosity dielectric without settling-out problems. Larger size ferromagnetic and nonferromagnetic particles may be used at the expense of reduced capacity and decreased voltage rating of the capacitor in order to achieve economy. For particles above about 30 microns, no special manufacturing process is required and, consequently, they are very inexpensive. However, they must be used with a high viscosity dielectric material and, as indicated previously, will reduce the capacity and voltage ratings of the capacitor.

In a preferred embodiment of the invention, the ferromagnetic foils 11 and 12, and the ferromagnetic particles are iron. The nonferromagnetic foils 15 and 16, and the nonferromagnetic particles are aluminum. Preferably, all of the ferromagnetic and nonferromagnetic particles are of approximately equal size.

Figure 2:
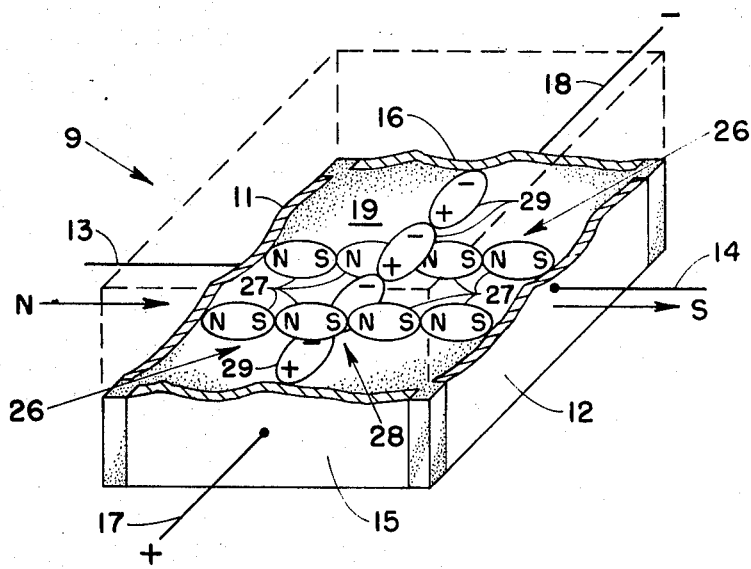
FIG. 2 is a schematic drawing of a capacitor embodying the invention.

Referring now to FIG. 2 there is shown in schematic form the capacitor 9 of FIG. 1, like parts being identified by like numerals. Filaments 26 formed of ferromagnetic particles 27 which are shown in grossly exaggerated size, provide direct metallic connections between the ferromagnetic foils 11 and 12. A filament 28 formed of nonferromagnetic particles 29, which are shown in grossly exaggerated size, is shown connecting the nonferromagnetic foils 15 and 16. While only filaments 26 and 29 are shown for clarity, it will be understood that a plurality of mutual perpendicular filaments of both ferromagnetic and nonferromagnetic types exist in the capacitive body 19. Also, there will be a substantial number of partial filaments. Accordingly, to obtain maximum capacitance, partial filaments which extend inwardly from the foils 11, 21, 15 and 16 are utilized by connecting leads 13 and 17 to leads 14 and 18, respectively. This connects like pairs of foils together and establishes two output connection leads for the capacitor.

It will be understood that changes and modifications may be made in the above-described capacitor and method without departing from the spirit and scope of the invention as set forth in the claims appended hereto.

What is claimed is:
1. A method of making a capacitor comprising the steps of:
   mixing ferromagnetic particles, nonferromagnetic particles and a dielectric material;
   subjecting the mixture to mutually perpendicular magnetic and electric fields;
   solidifying the dielectric material thereby providing a matrix for the particles; and,
   removing said magnetic and electric fields.

2. The method of claim 1 wherein a pair of ferromagnetic foils with leads attached thereto are placed against respective inner surfaces of opposite ends of a container for the mixture substantially perpendicular to the magnetic field, and a pair of nonferromagnetic foils with leads attached thereto are placed against respective inner surfaces of opposite sides of the container substantially perpendicular to the electric field before the particles and the dielectric are mixed.

3. The method of claim 1 wherein the dielectric material of said mixture is a powder and including the step of heating said dielectric material to melt same after mixing step.

4. The method of claim 1 wherein the mixture comprises from about 10% to about 20% by volume of dielectric material.

5. The method of claim 1 wherein said ferromagnetic and said nonferromagnetic particles range in size from about 0.2 micron to about 1.0 micron.

6. The method of claim 1 wherein said ferromagnetic particles are iron and said nonferromagnetic particles are aluminum.

7. The method of claim 1 wherein substantially all of said ferromagnetic and nonferromagnetic particles are approximately equal in size.

8. The method of claim 1 wherein the electric field is of the alternating type.

9. A capacitor comprising:
   a plurality of ferromagnetic particles;
   a plurality of nonferromagnetic particles; and
   a dielectric matrix, said particles being distributed throughout said matrix, said ferromagnetic particles forming a plurality of filaments disposed in a first direction, said nonferromagnetic particles forming a plurality of filaments in a second direction which is substantially perpendicular to said first direction.

10. The capacitive body set forth in claim 9 and including a pair of spaced apart ferromagnetic electrode foils disposed substantially perpendicular to the filaments formed by the ferromagnetic particles and a pair of spaced apart nonferromagnetic electrode foils disposed substantially perpendicular to the filaments formed by said nonferromagnetic particles.

11. The structure of claim 9 wherein substantially all of said ferromagnetic and nonferromagnetic particles are approximately equal in size.

12. The structure of claim 9 wherein said ferromagnetic particles are iron and said nonferromagnetic particles are aluminum.

13. The capacitive body of claim 9 wherein said ferromagnetic particles and said nonferromagnetic particles range in size from about 0.2 micron to about 1 micron.

14. The capacitive body of claim 9 wherein said ferromagnetic particles and said nonferromagnetic particles range in size from about 1.0 micron to about 30 microns.

References Cited
UNITED STATES PATENTS
2,892,139    6/1959    Salzberg _____ 317—258

ELLIOT A. GOLDBERG, Primary Examiner

U.S. Cl. X.R.
29—25.42; 252—63.5